United States Patent
Berthier et al.

(10) Patent No.: US 9,547,498 B2
(45) Date of Patent: Jan. 17, 2017

(54) METHOD AND CHIP CARD FOR TRANSMITTING INFORMATION

(71) Applicant: MORPHO, Issy-les-Moulineaux (FR)

(72) Inventors: Mael Berthier, Issy-les-Moulineaux (FR); Louis-Philippe Goncalves, Issy-les-Moulineaux (FR); Francois Lecocq, Issy-les-Moulineaux (FR); Cyrille Pepin, Issy-les-Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 74 days.

(21) Appl. No.: 14/402,731

(22) PCT Filed: May 21, 2013

(86) PCT No.: PCT/EP2013/060375
§ 371 (c)(1),
(2) Date: Nov. 21, 2014

(87) PCT Pub. No.: WO2013/174796
PCT Pub. Date: Nov. 28, 2013

(65) Prior Publication Data
US 2015/0143096 A1 May 21, 2015

(30) Foreign Application Priority Data
May 23, 2012 (FR) .................................... 12 54701

(51) Int. Cl.
*G06F 9/44* (2006.01)
*G06K 19/073* (2006.01)
(Continued)

(52) U.S. Cl.
CPC .......... *G06F 9/441* (2013.01); *G06K 19/0722* (2013.01); *G06K 19/07309* (2013.01); *G09C 1/00* (2013.01); *H04L 9/004* (2013.01)

(58) Field of Classification Search
None
See application file for complete search history.

(56) References Cited

U.S. PATENT DOCUMENTS 7,011,252 B2 * 3/2006 Ohya ...................... G06F 9/441
                                                    235/380
7,139,915 B2 * 11/2006 DeTreville ............ G06F 9/4406
                                                    713/156
(Continued)

FOREIGN PATENT DOCUMENTS

FR    2 863 745    6/2005
WO    01 71658     9/2001

OTHER PUBLICATIONS

Marc Witteman, Advances in Smartcard Security, Information Security Bulletin, Jul. 2002.*
(Continued)

*Primary Examiner* — Nabil El Hady
(74) *Attorney, Agent, or Firm* — Oblon, McClelland, Maier & Neustadt, L.L.P.

(57) ABSTRACT

A card including a data transmission mechanism using annex transmission channels. A method is described for the transmission of data by a chip card at an end of its life using hidden communication channels different from standard communication channels of the card. The data are transmitted by modulating a binary signal that results from a modification of a hardware parameter of the card.

19 Claims, 2 Drawing Sheets

(51) Int. Cl.
*G06K 19/07* (2006.01)
*G09C 1/00* (2006.01)
*H04L 9/00* (2006.01)

(56) References Cited

U.S. PATENT DOCUMENTS

| | | | | |
|---|---|---|---|---|
| 7,620,823 | B2* | 11/2009 | Kim | G06K 19/07363 |
| | | | | 713/194 |
| 7,890,741 | B2* | 2/2011 | Du | G06F 9/441 |
| | | | | 713/1 |
| 8,024,557 | B2* | 9/2011 | Cumming | G06F 9/441 |
| | | | | 713/1 |
| 8,959,324 | B2* | 2/2015 | Youn | G06F 9/441 |
| | | | | 455/558 |
| 2001/0037450 | A1* | 11/2001 | Metlitski | G06F 12/1408 |
| | | | | 713/152 |
| 2001/0049775 | A1 | 12/2001 | Rechberger et al. | |
| 2005/0140501 | A1 | 6/2005 | Rizzo et al. | |
| 2006/0236086 | A1* | 10/2006 | Tsuji | G06F 9/441 |
| | | | | 713/2 |
| 2009/0037909 | A1* | 2/2009 | Xu | G06F 9/45545 |
| | | | | 718/1 |
| 2009/0327463 | A1* | 12/2009 | Saito | G06F 21/575 |
| | | | | 709/222 |
| 2010/0299511 | A1* | 11/2010 | Pelletier | G06F 21/558 |
| | | | | 713/2 |

OTHER PUBLICATIONS

Moore et al., Improving Smart Card Security using Self-timed Circuits, 2002.*
International Search Report Issued Sep. 25, 2013 in PCT/EP13/060375 Filed May 21, 2013.

* cited by examiner

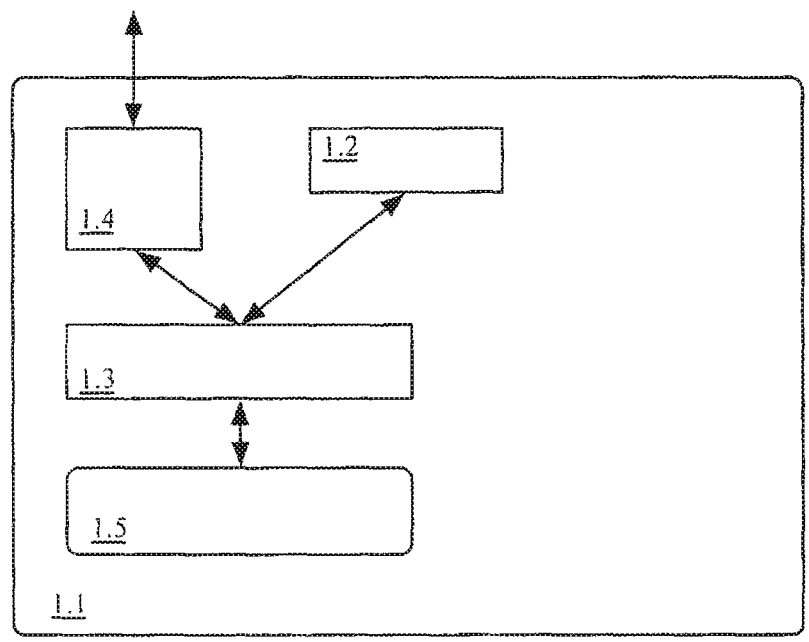
Background Art Fig. 1
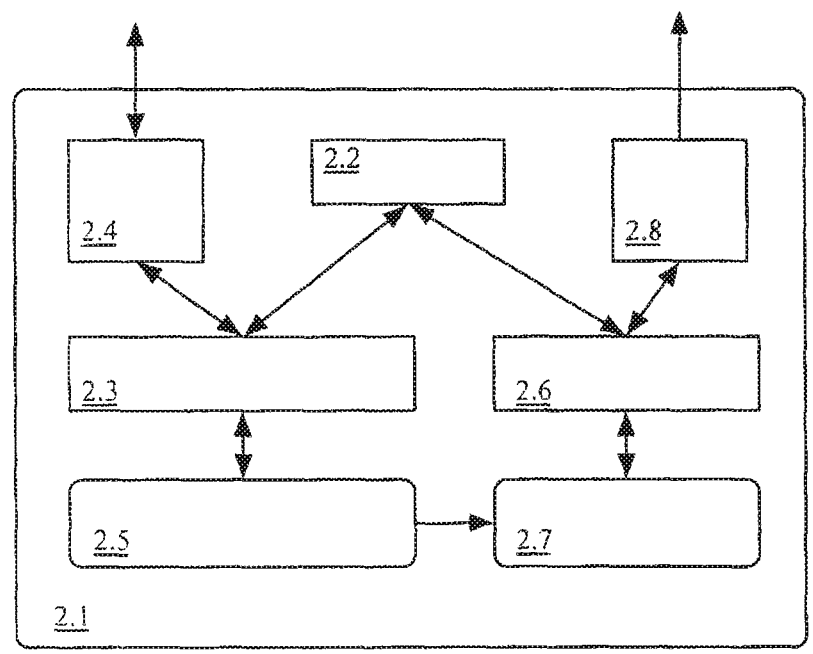
Fig. 2

METHOD AND CHIP CARD FOR TRANSMITTING INFORMATION

BRIEF SUMMARY OF THE INVENTION

The present invention concerns the field of chip cards and more particularly a card provided with data transmission means using annex transmission channels.

Chip cards experience a state known as "end of life" where it is no longer possible in theory to use the card. The card is in this state following an abnormality or an attack. The card locks up and refuses any functioning in order to preserve the integrity of the sensitive data that it contains and to ensure that they are not stolen.

Nevertheless, it would be advantageous to be able to know the problem giving rise to the card's going into this end-of-life state.

However, since the card is blocked, it is no longer possible to communicate with it. In addition, since the cause of the blocking of the card may be an attack, it is important not to compromise the sensitive data potentially contained in the card.

The invention aims to solve the above problems by means of a method for the transmission of data by a chip card at the end of its life using hidden communication channels different from the standard communication channels of the card. The data are transmitted by modulating a binary signal that results from the modification of a hardware parameter of the card.

In this way, the card has means for sending state information by means of a strictly monodirectional channel that in no way lessens the security of the card.

The invention concerns a chip card that comprises means for transmitting data using an annex transmission channel defined by the fact of using the controlled modification of a hardware characteristic detectable from outside the card.

According to a particular embodiment of the invention, it is controlled by a first operating system dedicated to control the card during its normal functioning, and comprises a second operating system dedicated to control the transmission of data by an annex channel.

According to a particular embodiment of the invention, it comprises a boot module for switching control to the second operating system when the card is marked as being at the end of its life and to the first operating system otherwise.

According to a particular embodiment of the invention, said second operating system comprises means for sending, via the annex channel, data stored in a memory space shared between the first and second operating systems.

According to a particular embodiment of the invention, the first operating comprises means for, when the card goes to the end of its life, copying data intended to be transmitted from a private memory space of the first operating system to the memory space shared between the two systems.

According to a particular embodiment of the invention, the first operating system also comprises means for enciphering copied data intended to be transmitted.

According to a particular embodiment of the invention, the first operating system also comprises means for checking the integrity of the copied data intended to be transmitted.

According to a particular embodiment of the invention, said annex channel uses a coding based on the use of a same instruction by modifying the execution clock frequency in order to modify the quantity of current consumed by the card during such execution.

According to a particular embodiment of the invention, said annex channel uses a coding based on the use of instructions from the cryptograph coprocessor for modifying the electromagnetic fields emitted by this coprocessor enabling use thereof to be detected.

The invention also concerns a method for booting a chip card that comprises:
  a step of launching a boot module when the card is powered up;
  a test step for determining whether the card is marked as being at the end of its life;
  a step of passing control to a first operating system if the card is not marked as being at the end of its life;
  a step of passing control to a second operating system if the card is marked as being at the end of its life;
  a step of the sending of data by said second operating system using an annex channel defined by the fact of using the controlled modification of a hardware characteristic of the card detectable from outside the card.

According to a particular embodiment of the invention, the step of sending data by said second operating system using an annex channel is repeated regularly as long as the card is powered up.

The features of the invention mentioned above, as well as others, will emerge more clearly from a reading of the following description of an example embodiment, said description being given in relation to the accompanying drawings, among which:

BRIEF DESCRIPTION OF THE SEVERAL VIEWS OF THE DRAWINGS

FIG. 1 illustrates the architecture of a chip card according to the prior art;

FIG. 2 illustrates the architecture of a chip card according to an example embodiment of the invention;

DETAILED DESCRIPTION OF THE INVENTION

Figure 3:
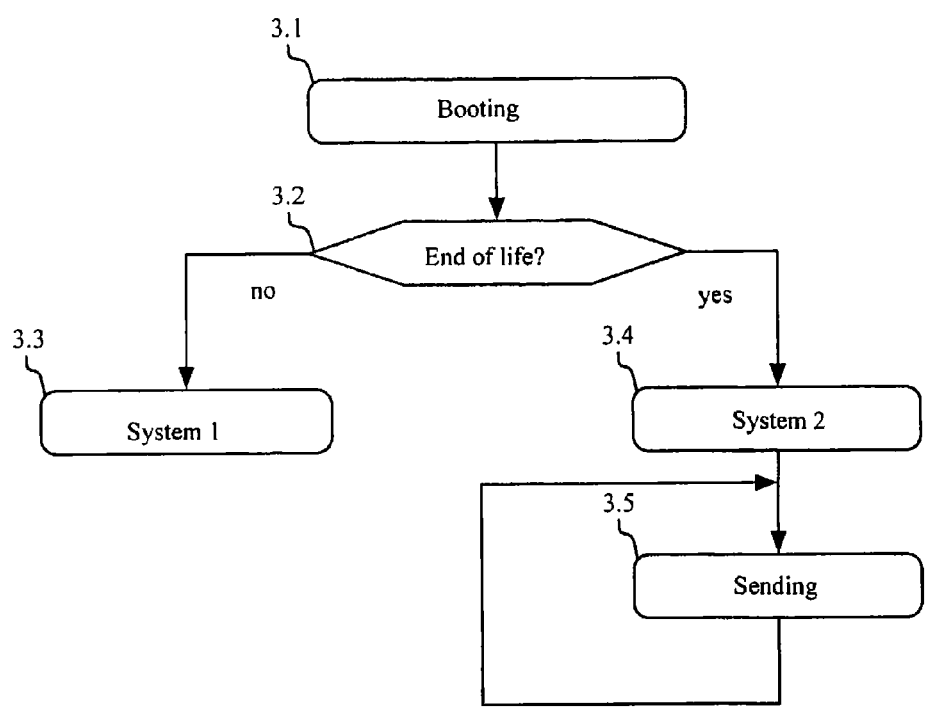
FIG. 3 illustrates the transmission method according to an example embodiment of the invention.

FIG. 1 illustrates the architecture of a chip card 1.1. The card contains a boot module 1.2. This module is activated automatically when the card is powered up. This module is responsible for checking the state of the card on booting. There exist typically two possible states for the card. A first state is the normal operating state of the card. In this state, the boot module passes control to the operating system 1.3 that drives the card. This operating system 1.3 uses at least one data storage space 1.5. It also manages an input/output module 1.4 allowing exchanges of data with the environment.

The card may also be in a second state referred to as the end-of-life state. When the boot module recognises that the card is in this end-of-life state, it does not pass control to the operating system 1.3. It interrupts the functioning of the card.

A functional card may decide to go to the end of its life for a great number of reasons. It may be a case of the detection of an attack or the detection of a fault. The procedure for going to end of life comprises several steps. It is a case of protecting the sensitive data contained in the card. To do this, all the deletable data are deleted. Depending on the hardware used, it is generally possible to block any access to memory pages by blocking address ranges. Typically, all the address ranges that can be blocked are blocked. The inputs/outputs of the card are also blocked. The card is then marked as being at the end of its life. This marking is typically done by storing a flag in non-volatile memory. This flag remains accessible to the boot module. It is by this means that this boot module has knowledge of the state of the card.

FIG. 2 illustrates the architecture of the card according to an example embodiment of the invention. This architecture repeats the elements of FIG. 1 referenced with the same minors. It contains a second operating system 2.6 having access to a storage space 2.7 shared between the first and second operating systems. The second operating system also controls an input/output module 2.8. This second operating system is dedicated to the transmission of data using an annex transmission channel of the card managed by the input/output module 2.8. In the present description, an annex transmission channel is defined as being a data transmission channel using the controlled modification of a physical characteristic of the card, this modification being detectable and measurable in intensity from outside the card. This physical characteristic, also referred to hereinafter as a hardware characteristic, may be the energy or the electric current consumed by the card itself, the energy carried by electromagnetic or sound waves emitted by the card or the thermal energy diffused by the card, or any form of any energy that is emitted by the card. The information transmitted by this annex transmission channel is coded in the form of a controlled modification, detectable and measurable from the outside of the card, of one of these physical characteristics.

When the card goes to the end of its life, information is then copied from the storage base 2.5, dedicated to the first operating system 2.3, to the shared storage space 2.7. This information is typically state information related to the reason for going to the end of life. It may be a case of a module involved in the detection of a fault. It may also be a case of the type of attack detected if the reason for going to the end of life is the detection of an attack. It may also be a case of any type of information that it is wished to have available once the card is at the end of its life. This copying of information, as well any enciphering thereof, is typically the only additional operation related to the invention occurring when the card goes to the end of its life.

FIG. 3 illustrates the method for booting up the card according to an example embodiment of the invention.

During a first step 3.1 the card boots up, typically following the powering up thereof. Control is automatically entrusted to the boot module. The latter tests, during a step 3.2, whether the card is at the end of its life. This test is typically done by reading the flag provided for this purpose. This flag is advantageously situated in the shared memory space of the card.

If the card is not at the end of its life, control is passed to the first operating system of the card during step 3.3. The card then functions entirely normally. It uses the normal input/output system for communicating with the outside.

On the other hand, if the card is at the end of its life, instead of being interrupted, the boot module passes control to the second operating system during a step 3.4. The purpose of this second operating system is to transmit the state information stored in the shared memory space to the outside. This transmission is done in the form of a sending of data via an annex transmission channel.

Advantageously, the sending of the data continues regularly as long as the card remains powered up.

According to a first embodiment of the invention, the hardware characteristic used for the annex channel is the current consumption of the card. In this embodiment, it is possible to modify by software the operating clock frequency of the card processor. It is then possible to use a chosen instruction of the processor that will be called at various clock frequencies in order to code binary information. According to the example embodiment, the instruction "NOP" is used. This instruction causes no calculation. However, it causes a current consumption dependent on the clock frequency selected. It should be noted that the duration of execution of an instruction also depends on the frequency selected, and on the duration of the coding symbol also. Advantageously, a state makes it possible to code an intermediate symbol introduced between two binary symbols. This makes it possible to easily distinguish two successive symbols with the same value.

According to another embodiment, the used hardware characteristic is the functioning of the cryptographic coprocessor. The symbols are coded in the form of instructions that use, or not, the cryptographic processor. A recording of the electromagnetic emissions emitted in the vicinity of this coprocessor makes it possible to recover a signal where appears the information on use of this coprocessor.

It is also possible to use the temperature of the card, since some instructions are known to cause heating of the processor, but others less. It is also possible to use sound or electromagnetic fields.

The principle is that the information is coded in the form of a detectable and controlled change in a hardware characteristic of the card.

It would have been possible to use the physical communication interfaces of the card, but this would have required implementing a complete communication controller within the second operating system. However, the solution adopted may advantageously be implemented by means of a few lines of code only. A loop reading the data to be sent and coded in the form of a series of instructions for modifying the physical characteristic chosen is sufficient. Since the memory space in a chip card is limited, this economy is advantageous. It should also be noted that since end of life may be caused by a fault in the card, the more limited the resources used for implementing the second system, the more chances are that it would be operational.

The advantage of this proposition therefore lies in the use of this communication protocol using all measurable modifications to the environment by the card. Related to the use of a communication project is the fact that the code developed for the occasion is compact and is executed apart from any code used during the normal operation of the card. This makes this implementation sure from a security point of view, since it uses a dedicated code. None of the security measures already present must be changed and these must function as normal to ward off any external attack.

The communication channel thus created is strictly monodirectional. This feature is important from a security point of view. It is not possible for an attacker to use this channel for writing data in the card or for attempting to cause an undesired behaviour thereof.

Only the data previously selected and transferred into the shared memory space can be sent. The second operating system has no access to the memory space managed by the first operating system potentially containing sensitive data.

The present invention serves mainly to effect a diagnosis for understanding what are the problems that have led the card to go to the end of its life. In this context, and for an example of use, it is entirely possible to encipher the data to be sent when the card goes to the end of its life. The enciphering mechanism and the key used are to be chosen carefully in order to preserve a good level of security. Advantageously, a mechanism for checking the integrity of the data is used, typically a checksum of the CRC (Cyclic Redundancy Check) type. When the card is in the "end of life" state and is powered up, it sends, by the use of the mechanism of the present invention, simply the data already enciphered that are stored in non-volatile memory.

More than a security measure when a card goes to the end of its life, this mechanism can also be used as an integral part of a communication protocol and/or security method.

For example, when a card is authenticated, it can send information necessary for the correct performance of authentication. This may for example be a random value or a serial number. It then becomes more difficult for an attacker to see and understand the information transmitted by this means. Because of their function, the terminals may have means for monitoring the consumption of the card. If the latter consumes too much at a given moment, this may be considered to be an attack and may block the card. These faults can especially be seen during the use of counterfeit cards. Thus, in a protocol agreed between the terminal and the card, higher consumption when sending a message at a very precise moment may be used in the context of authentication where such consumption would normally have blocked the card. It is then a case of a means for offering better security for the card and for the terminal that will communicate with it.

In this embodiment, the annex data channel is used by the first operating system during the normal functioning of the card. This functioning is then done in parallel to normal functioning and to the use of the normal transmission channels of the chip card.

According to the annex channel used, the normal functioning and the sending of data must be exclusive at a given instant in order to prevent the disturbances to the chosen hardware characteristic caused by the normal functioning of the card disturbing the sending of the data via the annex channel.

The invention described in the field of chip cards also concerns all the information processing devices using chips of the chip card type. Devices with USB keys containing such a chip or telephones using a SIM (Subscriber Information Module) card can for example be cited.

The invention claimed is:

1. A chip card, comprising:
processing circuitry configured to
execute a first operating system for controlling the chip card during normal functioning and execute a second operating system for controlling transmission of data by at least one annex channel in response to a determination that the chip card is in an end of life state;
switch control of the processing circuitry to the second operating system when the chip card is determined to be in an end of life state; and
in response to a determination that the chip card is marked as being in the end of life state, transmit, by the second operating system, data relating to the end of life state via the annex channel using a binary modulation of an environment of the chip card.

2. The chip card of claim 1, wherein the second operating system is configured to send, via the annex channel, the data relating to the end of life state stored in a memory space shared between the first and second operating systems.

3. The chip card of claim 2, wherein the first operating system is configured to copy, when the chip card is determined to be in the end of life state, the data relating to the end of life state to be transmitted from a private memory space of the first operating system to the memory space shared between the first and second operating systems.

4. The chip card of claim 3, wherein the first operating system is configured to encode the copied data relating to the end of life state that is to be transmitted.

5. The chip card of claim 3, wherein the first operating system is configured to check integrity of the copied data relating to the end of life state that is to be transmitted.

6. The chip card of claim 1, wherein the annex channel modulates current consumed by the chip card for coding the data relating to the end of life state in binary data.

7. The chip card of claim 6, wherein the data relating to the end of life state is coded in binary data by modifying a clock frequency of execution of a same instruction, thereby modifying a quantity of current consumed by the chip card during such execution.

8. The chip card of claim 1, wherein the annex channel modulates electromagnetic fields emitted by the chip card for coding the data relating to the end of life state in binary data.

9. The chip card of claim 8, wherein the data relating to the end of life state is coded in binary data using instructions of a cryptographic coprocessor of the chip card, thereby modifying electromagnetic fields emitted by the cryptographic coprocessor.

10. A method for booting a chip card, comprising:
determining whether the chip card is marked as in an end of life state;
passing control to a first operating system for controlling the chip card during its normal functioning if the chip card is not marked as being in the end of life state; and
in response to a determination that the chip card is marked as being in the end of life state,
passing control to a second operating system for controlling transmission of data relating to the end of life state by at least one annex channel; and
transmitting, by the second operating system, the data relating to the end of life state via the annex channel using a binary modulation of an environment of the chip card.

11. The method of claim 10, wherein the transmitting, in response to the determination that the chip card is marked as being in the end of life state, is repeated as long as the chip card is powered up.

12. The method of claim 10, wherein the transmitting includes transmitting, via the annex channel, the data relating to the end of life state stored in a memory space shared between the first and second operating systems.

13. The method of claim 12, further comprising copying, in response to the determination that the chip card is marked as being in the end of life state, the data relating to the end of life state to be transmitted by the transmitting from a private memory space of the first operating system to the memory space shared between the first and second operating systems.

14. The method of claim 13, further comprising encoding the copied data relating to the end of life state that is to be transmitted by the transmitting.

15. The method of claim 13, further comprising checking integrity of the copied data relating to the end of life state that is to be transmitted by the transmitting.

16. The method of claim 10, wherein the transmitting includes modulating current consumed by the chip card for coding the data relating to the end of life state in binary data.

17. The method of claim 16, wherein the modulating includes modifying a clock frequency of execution of a same instruction, thereby modifying a quantity of current consumed by the chip card during such execution.

18. The method of claim 10, wherein the transmitting includes modulating electromagnetic fields emitted by the chip card for coding the data relating to the end of life state in binary data.

19. The method of claim 18, wherein the modulating includes using instructions of a cryptographic coprocessor of the chip card, thereby modifying electromagnetic fields emitted by the cryptographic coprocessor.

* * * * *